United States Patent [19]

Meluch et al.

[11] 3,978,128

[45] Aug. 31, 1976

[54] METHOD OF RECOVERING AMINES BY THE HYDROLYTIC DECOMPOSITION OF POLYURETHANES

[75] Inventors: William C. Meluch, Birmingham; Gregory A. Campbell, Romeo, both of Mich.

[73] Assignee: General Motors Corporation, Detroit, Mich.

[22] Filed: Jan. 13, 1975

[21] Appl. No.: 540,610

[52] U.S. Cl. .............................. 260/570 D; 260/582
[51] Int. Cl.$^2$ ......................................... C07C 87/28
[58] Field of Search ....................... 260/570 D, 582; 202/185 A

[56] References Cited
UNITED STATES PATENTS

| | | | |
|---|---|---|---|
| 2,507,632 | 5/1950 | Hickman | 202/185 X |
| 2,915,462 | 12/1959 | Salmon | 202/185 X |
| 3,225,094 | 12/1965 | Wolf | 260/570 |
| 3,420,752 | 1/1969 | Kiras et al. | 203/94 |
| 3,478,099 | 11/1969 | Ross et al. | 260/570 |

*Primary Examiner*—Robert V. Hines
*Attorney, Agent, or Firm*—G. A. Grove

[57] ABSTRACT

In accordance with a preferred embodiment of this invention, amines may be efficiently recovered from the aqueous vapor produced by a high temperature hydrolytic decomposition of polyurethane by the following steps: 1) spraying the vapor with a relatively cool aqueous dispersion containing about 5 to 20% by weight of a solvent such as aniline or benzyl alcohol, 2) allowing the resulting effluent to settle into an amine rich organic phase which is separated from an aqueous phase by a clean interface, 3) separating the two phases, and then 4) distilling the organic phase to recover the desired amine product. The spraying may be conducted at atmospheric pressure and at a temperature within the range of 35° to 90° C. The majority of the solvent is also recovered during the distillation of the organic phase. The aqueous phase may also be distilled to recover additional amines and water, which may then be recycled.

3 Claims, No Drawings

METHOD OF RECOVERING AMINES BY THE HYDROLYTIC DECOMPOSITION OF POLYURETHANES

FIELD OF THE INVENTION

This invention relates to a method of recovering amines from the hydrolytic decomposition of polyurethanes.

BACKGROUND OF THE INVENTION

A preferred way of handling the millions of pounds of polyurethane scrap, which are generated each year, is to decompose the resin into its basic constituents — a polyol and an amine which is typically a diamine. Potentially, this decomposition process is a primary step in recycling these basic materials. One method of decomposing a polyurethane resin is to expose it to superheated steam at a temperature in the range of from about 500° F. to 650° F. One product of this decomposition is an amine rich aqueous vapor. However, this product contains not only amines and steam but also a variety of other products in particulate, liquid and vapor form; typically the amines are in the vapor phase. Thus, the problem is one of cooling this vapor and recovering amines; this, of course, must be done under conditions which will prevent the amines from undergoing any degradative chemical reaction such as oxidation.

Traditionally, this type of recovery problem has been solved by either distillation or a liquid extraction process. However, both of these processes would require an intermediate step of condensing the vapor. In developing the most efficient process it was decided that a spray condenser could be used to condense the vapor and at the same time initiate a solvent extraction process. Thus, the impinging spray in the condenser would contain water and a suitable solvent. For this process to be successful, the solvent would have to meet the following criteria. First, it would have to have a high solvating power for the desired amine products. Second, it would have to have a high boiling point; that is greater than 120° C.; and, third, it must be able to protect the amine products against oxidation. In addition to these requirements, it was learned that the extracting solvent would also have to have either a strong affinity for or the ability to repulse the particular contaminants in the original vapor product to promote a clean interface when the organic and aqueous phases separate.

Unfortunately, most common solvents, such as chloroform, methylene chloride and ethyl acetate, failed in the latter respect, and the particulate contaminants were able to collect at the interface and diffuse it to such a degree that it was extremely difficult to separate the phases.

OBJECTS OF THE INVENTION

It is an object of this invention to provide a method of efficiently recovering amines from the hot aqueous vapors produced by the hydrolytic composition of polyurethanes.

It is a further object of this invention to provide a solvent or combination of solvents which may be effectively used in combination with a water spray to condense the hot vapors produced by the hydrolytic decomposition of polyurethanes and to initiate a solvent extraction process.

SUMMARY OF THE INVENTION

In accordance with a preferred embodiment of this invention, the hot aqueous vapor produced by the high temperature hydrolytic decomposition of polyurethane is introduced into a recycling spray condenser and sprayed with an aqueous dispersion or solution containing from 5 to 20 percent of a solvent selected from the group of aniline and benzyl alcohol; this condenses the vapor and forms a two-phase effluent. The rate of vapor flow into the spray condenser should be about ½% by weight of the rate of flow of the aqueous dispersion.

The effluent from the spray condenser is then conducted to a settling vessel and allowed to separate into an amine rich organic phase and an aqueous phase. The phases are subsequently separated and then both individually distilled to recover the solvent which may then be recycled and the desired amine products from one phase, and relatively pure water and a minor portion of the desired amines from the other phase. Both phases have azeotropic properties which facilitate the distillation process by allowing both the water and the solvent to be simultaneously removed from the desired amine product.

By the use of a preferred solvent such as benzyl alcohol or aniline in the subject process, it is possible to prevent the accumulation of various undetermined materials in the pipes which carry the condensate from the spray condenser and thereby prevent these lines from plugging; it is also possible to obtain a clean separation at room temperature between the amine rich organic phase and the water phase; and finally it is also possible to gain the benefits of an azeotrope in the subsequent distillation processes. In addition, since these two solvents have a strong solvating power for the desired amine products, the liquid extraction process is relatively efficient. Other advantages of this invention will be more readily understood in view of a detailed description thereof to include specific examples.

DETAILED DESCRIPTION OF THE INVENTION

In accordance with the practice of this invention, the vapor product of the high temperature hydrolytic decomposition of polyurethanes which product contains water, amines and other materials, either solids, liquids, or gases, is continuously passed into a spray condenser. Once in the condenser, the vapor product is sprayed with an aqueous dispersion, preferably a solution, containing from 2 to 30% by weight, preferably from 4% to 20%, of an organic polar aromatic solvent, the chemical structure of which contains either nitrogen or oxygen, and which has the following properties: 1) a high solvating power for whatever amine is produced from the hydrolytic decomposition process; 2) a boiling point above 120° C. but below 300° C. and a melting point below room temperature; and 3) a favorable solubility temperature coefficient in water, that is, it is preferred that the solvent be somewhat soluble in water at temperatures above 70° or 75° C. and insoluble and immiscible with water at room temperature. However, it is not necessary that the solvent be totally soluble in water at the elevated temperatures, but this condition would be preferred. In addition, a suitable solvent must have the ability to protect the amine against oxidation and, finally, it must be able to promote a distinct interface with water at room temperatures in the presence of the particulate contaminants from the hydrolytic decomposition process. Examples of such a suitable solvent include the aforementioned aniline and benzyl alcohol, and anisole, toluidine, dimethylaniline, phenol ethanol, and the like. The aforementioned high solvating power for the amine product which a suitable solvent must have, may be quantified in terms of a distribution coefficient. This term is determined for a specific solvent, by adding that solvent to an aqueous solution of the desired amine product, and shaking the dispersion. After settling into a solvent phase and a water phase, the concentration of the amines in both phases is measured. The distribution coefficient is the ratio of the concentration of the amines in the organic phase to the concentration of the amines in the aqueous phase. A suitable solvent should have a distribution coefficient of at least 2 and preferably of the order of about 10 or above.

The spray condenser is to be operated at a temperature within the range of from about 35° to about 90° C., and the rate at which the amine-containing vapor is introduced into the spray condenser shall be from about ½ to 5% by weight of the rate at which the aqueous spray is introduced into the spray condenser. In the operation of the spray condenser, it would be preferred to reduce, 1) the temperature, 2) the rate at which the water-solvent dispersion or solution is sprayed and, 3) the solvent content to a minimum for obvious economic reasons.

The effluent from the spray condenser is cooled to room temperature and passed to a settling vessel wherein the organic and aqueous phase quickly separate and may be continuously drawn off. The organic phase contains the solvent and most of the desired amine products. Comparatively, the aqueous phase contains some solvent and a small portion of the amine products; however, these concentrations will be at a minimum if a preferred solvent is used. The organic phase is then distilled to yield the amine product and a recyclable solvent; the aqueous phase is distilled to purify the water which may also be recycled.

The practice of this invention will be more readily understood in view of the following specific example.

EXAMPLE

The vapor from the high temperature (i.e., 500° to 650° F.) hydrolytic decomposition of polyurethanes was passed into a recycling spray condenser at the rate of about ½% by weight at which the water solvent was sprayed into the condenser. The condensate was recycled at a rate of about 2 gallons per minute and a side stream of product was drawn off at a rate of about 2½ gallons per hour. In this example the coolant consisted of a mixture of about .7% by weight of aniline in water. A total of 15 gallons of this mixture was used over a period of about 6 hours. The spray condenser was run at a mean temperature of from about 70° to 80° C.

The effluent from the spray condenser was passed into a settling tank, and the organic phase which was then drawn off from the bottom of the tank measured about 3,500 millimeters. The organic phase was then distilled at reduced pressure. The first fraction produced by this distillation was an azeotrope which contained 3,004 grams of aniline and 250 grams of water, leaving 250 grams of a dark viscous residue which was shown by thin layer chromatography to contain 2,4-toluenediamine and 4,4-methylenedianiline. Further distillation of this residue produced a mixture of about 104 grams of mixed diamines which may then be reused in the production of polyurethane resins and 80 grams of an intractable residue.

While our invention has been described in terms of specific embodiments, other variations would be readily obvious to those skilled in the art. Therefore, the scope of the invention is not to be limited to those specific embodiments, but only by the following claims.

What is claimed is:

1. In a process for recovering amines from the high temperature hydrolytic decomposition product of polyurethanes, which product contains water vapor and amines, the improvement comprising:
   a. conducting said product to a continuous recycling spray condenser wherein said product is sprayed with an aqueous mixture containing from about 3 to about 20% by weight of an extracting polar aromatic solvent, the chemical structure of which solvent contains an atom selected from the group consisting of nitrogen and oxygen, and which solvent has:
      1. a boiling point within the range of 120° to 300° C.,
      2. a melting point below room temperature,
      3. the ability to protect said amine products from degradative oxidation,
      4. a distribution coefficient for the amine product with water of at least 2;
   said condenser yielding a two-phase liquid comprising an amine rich solvent phase and a water phase; and
   b. separating by distillation the amine component from said organic phase.

2. In a process for recovering amines from the high temperature hydrolytic decomposition product of polyurethanes, the improvement comprising:
   a. conducting said product to a continuous recycling spray condenser wherein said product is sprayed with an aqueous mixture containing from about 3 to about 20% by weight of benzyl alcohol, said condenser yielding a two-phase liquid comprising an amine rich organic phase and a water phase;
   b. separating said organic phase from said water phase; and
   c. separating by distillation the amine component from said organic phase.

3. In a process for recovering amines from the high temperature hydrolytic decomposition product of polyurethanes, the improvement comprising:
   a. conducting said product to a continuous recycling spray condenser wherein said product is sprayed with an aqueous mixture containing from about 3 to about 20% by weight of an extracting solvent selected from the group consisting of aniline, benzyl alcohol, anisole, dimethyl aniline, toluidine, and phenyl ethanol, said condenser yielding a two-phase liquid comprising an amine rich solvent phase and a contaminated water phase;
   b. separating said organic phase from said water phase; and
   c. separating by distillation the amine component from said organic phase.

* * * * *